(12) United States Patent
Malsch et al.

(10) Patent No.: US 7,121,625 B2
(45) Date of Patent: Oct. 17, 2006

(54) HEADREST MECHANISM

(75) Inventors: Heiko Malsch, Heiningen (DE);
Harald Fischer, Unterensingen (DE)

(73) Assignee: Lear Corporation, Southfield, MI (US)

( * ) Notice: Subject to any disclaimer, the term of this patent is extended or adjusted under 35 U.S.C. 154(b) by 58 days.

(21) Appl. No.: 10/331,777

(22) Filed: Dec. 30, 2002

(65) Prior Publication Data
US 2004/0124686 A1   Jul. 1, 2004

(51) Int. Cl.
*B60N 2/48* (2006.01)

(52) U.S. Cl. ...................... 297/410; 297/410

(58) Field of Classification Search ............... 297/391, 297/410, 61, 216.12
See application file for complete search history.

(56) References Cited

U.S. PATENT DOCUMENTS

| | | | |
|---|---|---|---|
| 4,466,662 A | | 8/1984 | McDonald et al. |
| 4,489,979 A | | 12/1984 | Zyngier |
| 4,560,202 A | * | 12/1985 | Koelle et al. ............... 297/410 |
| 4,657,425 A | | 4/1987 | Takahashi |
| 4,854,642 A | | 8/1989 | Vidwans et al. |
| 4,923,250 A | * | 5/1990 | Hattori ....................... 297/410 |
| 5,080,437 A | | 1/1992 | Pesta et al. |
| 5,131,720 A | * | 7/1992 | Nemoto ...................... 297/410 |
| 5,222,784 A | * | 6/1993 | Hamelin ..................... 297/408 |
| 5,433,508 A | * | 7/1995 | Akima et al. ............... 297/410 |
| 5,445,434 A | | 8/1995 | Kohut |
| 5,626,361 A | * | 5/1997 | Heiner ........................ 280/756 |
| 5,788,250 A | * | 8/1998 | Masters et al. ............. 297/410 |
| 5,895,094 A | * | 4/1999 | Mori et al. .................. 297/410 |
| 5,918,940 A | * | 7/1999 | Wakamatsu et al. ........ 297/410 |
| 5,927,813 A | | 7/1999 | Nemoto |
| 6,062,645 A | | 5/2000 | Russell |
| 6,296,316 B1 | | 10/2001 | Hann |
| 6,345,549 B1 | * | 2/2002 | Lance ........................ 74/500.5 |
| 6,364,415 B1 | * | 4/2002 | Mori et al. ................. 297/410 |
| 6,390,558 B1 | * | 5/2002 | Fischer et al. .............. 297/410 |
| 6,454,356 B1 | | 9/2002 | Yamada |
| 6,460,931 B1 | * | 10/2002 | Beck .......................... 297/410 |
| 6,572,186 B1 | | 6/2003 | Fischer et al. |
| 2002/0113483 A1 | | 8/2002 | Fischer et al. |

FOREIGN PATENT DOCUMENTS

DE       19947621 A1    10/1999
DE       100 08 524 A1   8/2001

* cited by examiner

*Primary Examiner*—Peter R. Brown
(74) *Attorney, Agent, or Firm*—Brooks Kushman P.C.

(57) ABSTRACT

A headrest mechanism including a post extending from a headrest pad, a tubular bushing adapted to be coupled to an occupant seat, a slider assembly, and an actuator. The slider assembly is moveably positioned within the bushing and includes a block selectively moveable between a position engaged with and a position disengaged with the bushing. A post of the headrest pad is coupled to the slider assembly such that movement of the slider assembly causes the headrest pad to move.

17 Claims, 5 Drawing Sheets

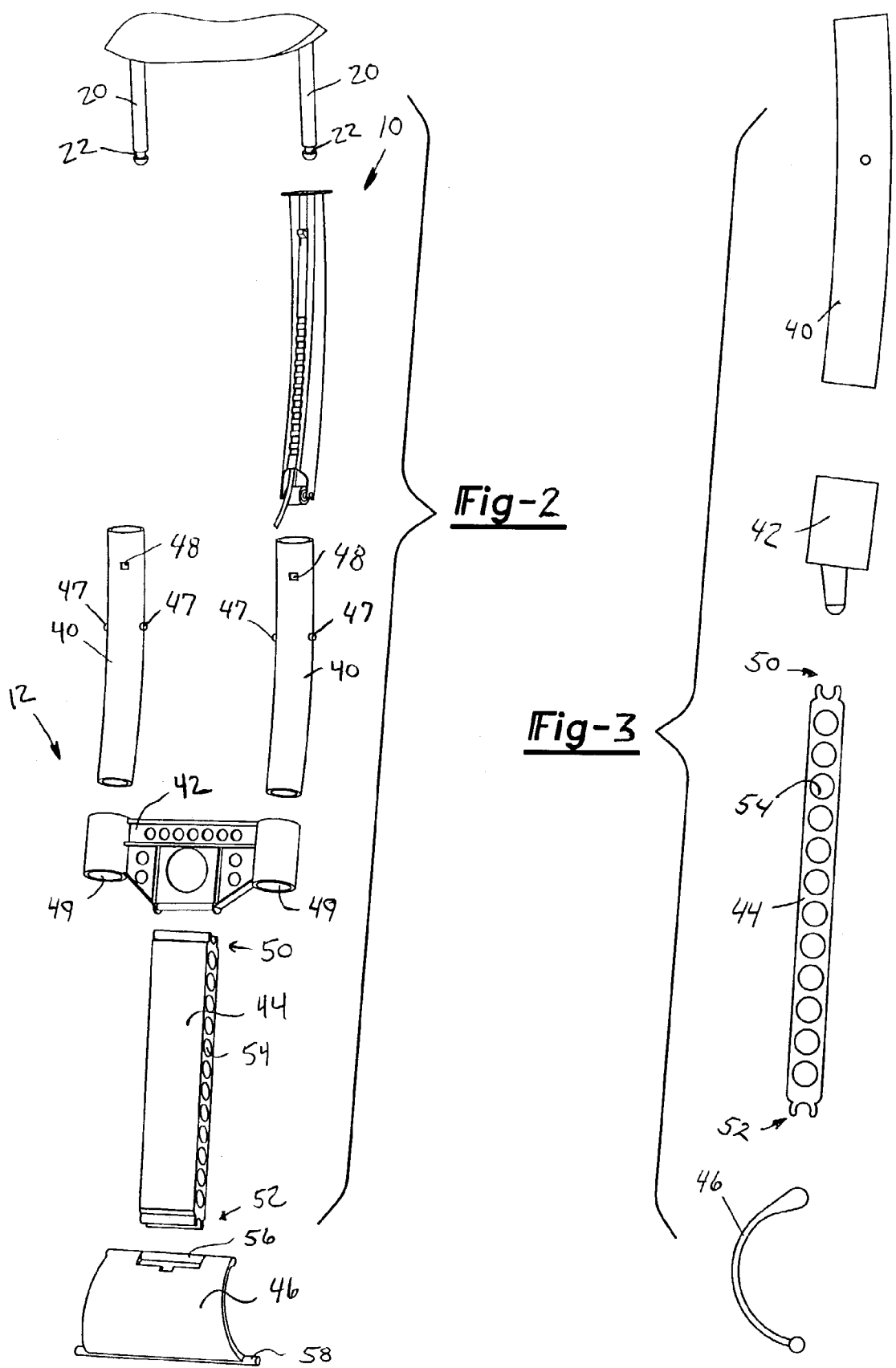

HEADREST MECHANISM

BACKGROUND OF THE INVENTION

The present invention relates to occupant seats and, more particularly, to a seat headrest mechanism.

A variety of headrest adjustment and retention mechanisms have been constructed for use with occupant seats. Many of these mechanisms allow the occupant to manually adjust the position of the headrest to conform to a specific occupant's physical characteristics. These mechanisms require the occupant to provide the lifting or lowering force. While these mechanisms have been effectively implemented in vehicles, certain luxury vehicle markets would benefit from a power assisted headrest adjustment mechanism.

Power assisted headrest mechanisms also exist. However, improvements to the field of invention may be made. For example, some of the known devices are relatively costly and complex having a large number of components. Additionally, it would be desirable to easily modify existing manually adjustable headrest attachment systems to incorporate a powered headrest mechanism.

SUMMARY OF THE INVENTION

In accordance with the present invention, a headrest mechanism includes a post extending from a headrest pad, a tubular bushing adapted to be coupled to an occupant seat, a slider assembly and an actuator. The slider assembly is moveably positioned within the bushing and includes a block selectively moveable between a position engaged with and a position disengaged with the bushing. The post of the headrest pad is coupled to the slider assembly such that movement of the slider assembly causes the headrest pad to move. The actuator is coupled to the slider assembly to selectively move the slider and position the headrest pad in a desired location. The block engages the bushing when the post is disconnected from the slider assembly to restrict the movement of the slider assembly relative to the bushing.

Accordingly, the present invention provides a cost effective power actuated headrest which may be easily manufactured and assembled. Additionally, the power actuated headrest of the present invention may be used in conjunction with a self-aligning headrest system with minor modifications to the self-aligning headrest system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is an exploded perspective view of a portion of an occupant seat equipped with the headrest mechanism of the present invention;

FIG. 3 is an exploded side view of a portion of an occupant seat equipped with the headrest mechanism of the present invention;

DETAILED DESCRIPTION OF THE PREFERRED EMBODIMENT

The following description of the preferred embodiment is merely exemplary in nature and is in no way intended to limit the invention, its application, or uses.

Figure 1:
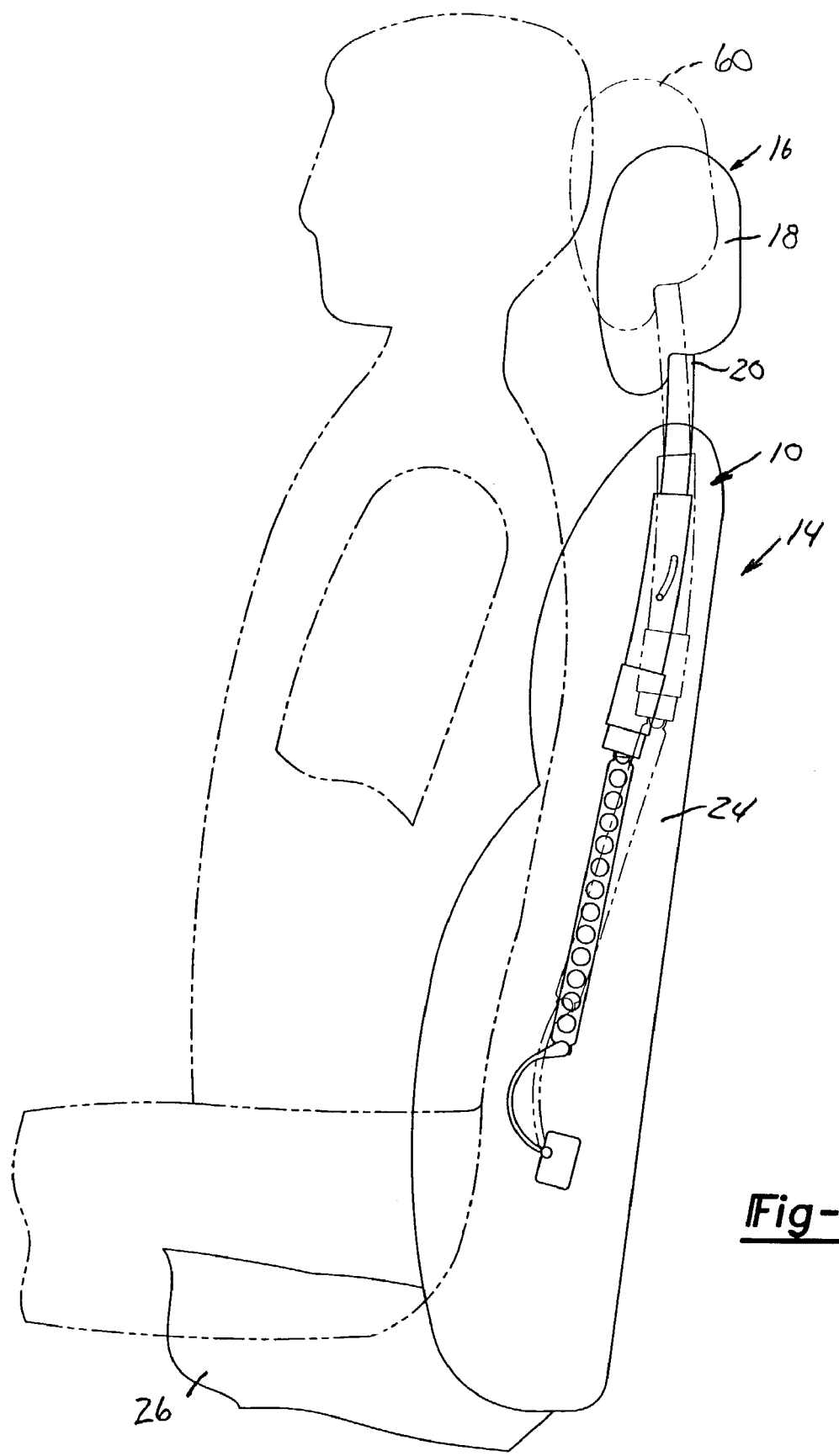
FIG. 1 is a side view depicting articulation of the headrest mechanism of the present invention.

Referring to FIGS. 1–3, a headrest mechanism 10 is shown in conjunction with an exemplary self-alignment mechanism 12 of a seat assembly 14 preferably employed in an automotive vehicle. Seat assembly 14 includes a headrest assembly 16 having a headrest pad 18 and a pair of posts 20 downwardly extending therefrom. An annular groove 22 is positioned proximate the distal end of each post 20. Seat assembly 14 also includes a seat back 24 pivotally coupled to a seat bottom 26.

Figure 4:
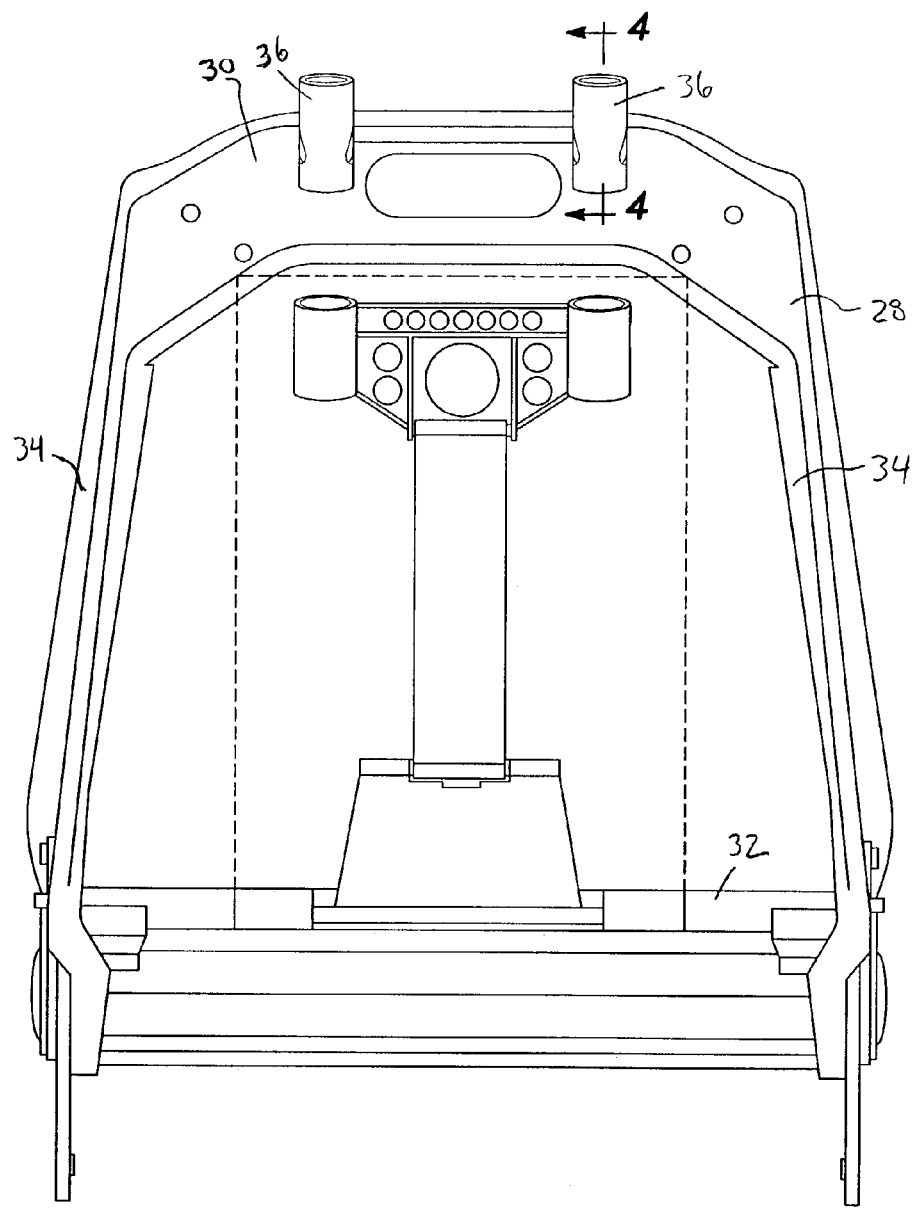
FIG. 4 is a plan view of a portion of a seat frame for use in conjunction with the headrest mechanism of the present invention.
Figure 5:
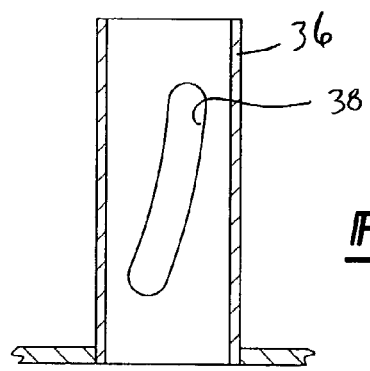
FIG. 5 is a partial cross-sectional view of the frame depicted in FIG. 4.

With reference to FIGS. 4 and 5, a frame 28 is positioned within seat back 24. Frame 28 includes an upper cross member 30 and a lower cross member 32 interconnecting a pair of side members 34. A pair of tubular supports 36 extend through cross member 30. Each support 36 includes a pair of arcuate slots 38 extending therethrough.

Self-alignment mechanism 12 includes a pair of guidance sleeves 40, a brace 42, a link 44 and a plate 46. Guidance sleeves 40 are generally tubular members having a slight curve. Each guidance sleeve 40 includes a pair of radially extending cams 47 and a rectangular aperture 48. Cams 47 are positioned within slots 38 of supports 36. One of guidance sleeves 40 is in receipt of headrest mechanism 10. Only one headrest mechanism 10 is depicted as being coupled to seat assembly 14. It should be appreciated that a duplicate mechanism may be installed within the other guidance sleeve, if necessary. Posts 20 of headrest assembly 16 are moveably positioned within guidance sleeves 40. Guidance sleeves 40 are received within holders 49 of brace 42.

Brace 42 is pivotally coupled to a first end 50 of link 44. Similarly, a second end 52 of link 44 is pivotally coupled to plate 46. A series of bores 54 extend through link 44 to reduce the weight of the link. Plate 46 is preferably constructed from a resilient material such as spring steel or plastic. Plate 46 is initially formed as a curved sheet having a convex shape in the direction of the seat occupant. As such, the effective length of plate 46 may be varied through the application of pressure. Plate 46 includes an upper pin 56 pivotally connected to second end 52 of link 44 and a lower pin 58 pivotally coupled to cross member 32 of frame 28.

In the event of a rear end collision, the occupant's pelvis initially travels into the seat back. The pelvis is generally the center of gravity of the occupant. As the pelvis is pressed into plate 46, the curve of the plate is reduced such that plate 46 becomes less curved or flattened. As plate 46 flattens, it's effective length increases. Specifically, the distance between second end 52 and cross member 32 increases, effectively moving link 44 upward. As link 44 is moved upward, headrest assembly 16 is moved upward and pivots forward to a position 60 shown in phantom line representation in FIG. 1.

Figure 6:
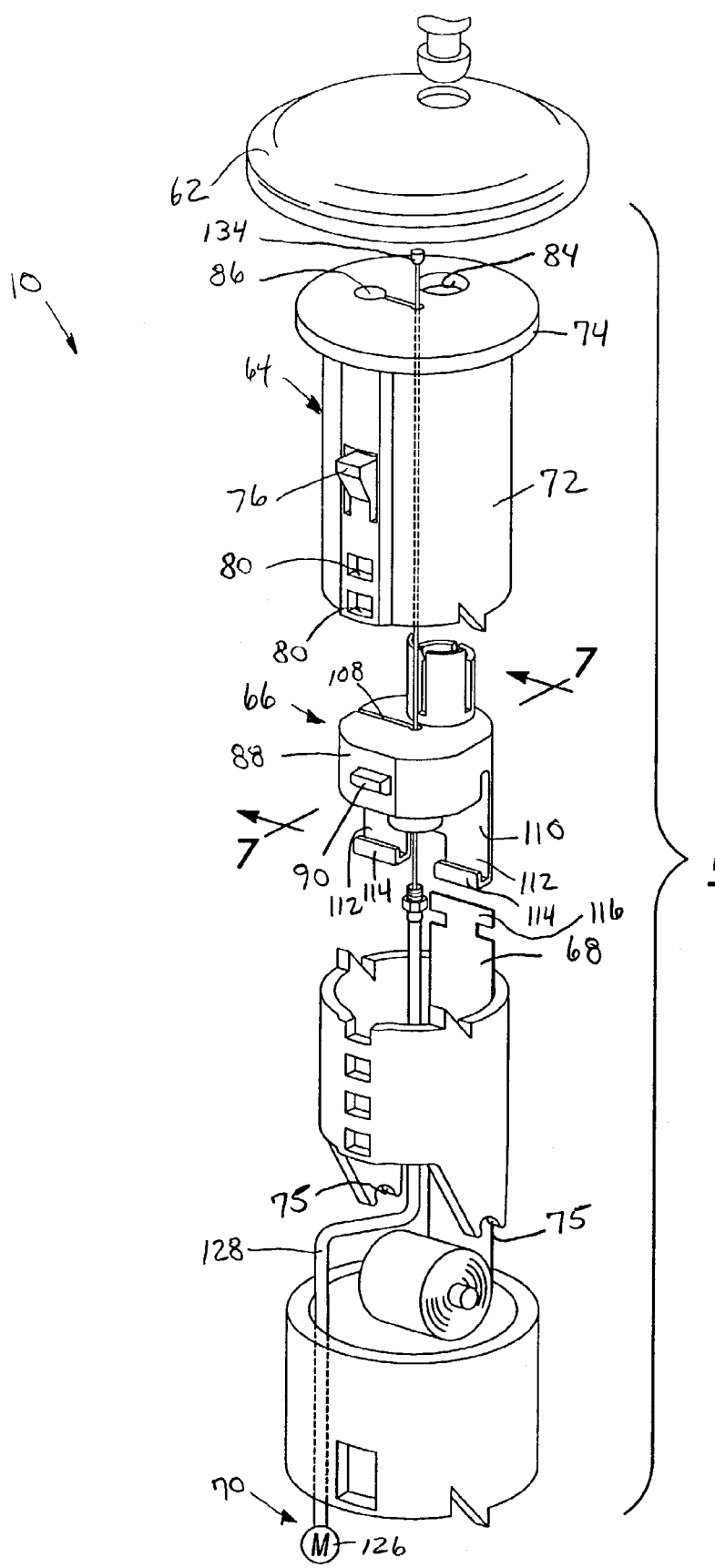
FIG. 6 is a partial exploded perspective view of the headrest mechanism of the present invention.
Figure 7:
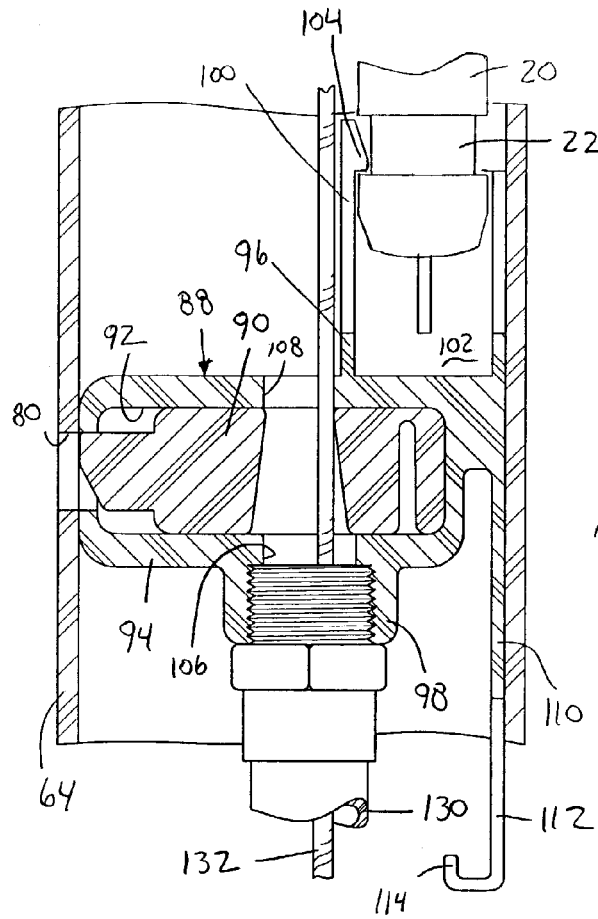
FIG. 7 is a partial cross-sectional side view of the headrest mechanism of the present invention showing the slider assembly in a disengaged mode.
Figure 8:
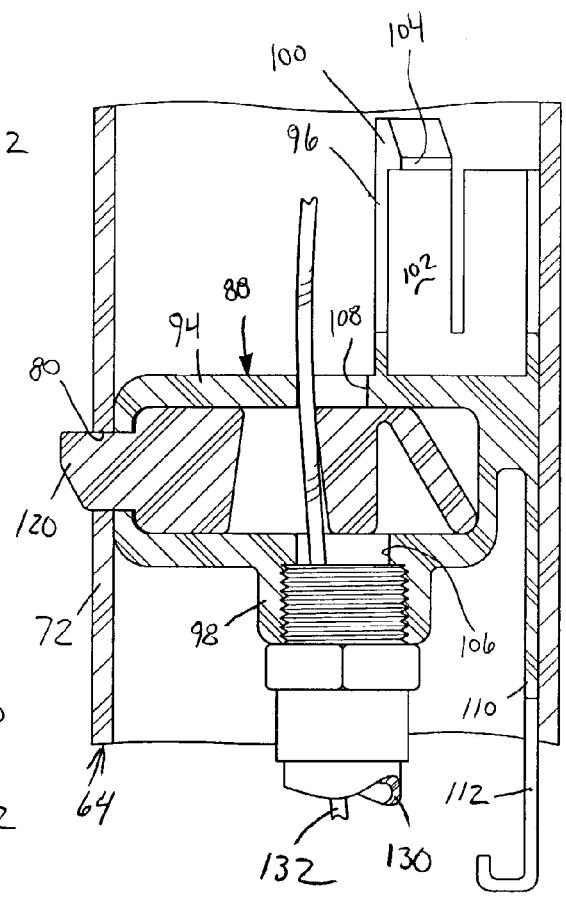
FIG. 8 is a partial cross-sectional side view of the headrest mechanism of the present invention showing the slider assembly in an engaged mode.

With reference to FIGS. 6–8, headrest mechanism 10 includes a cover 62, a bushing 64, a slider assembly 66, a return spring 68 and an actuator 70. Headrest mechanism 10 provides for simple attachment and removal of headrest assembly 16 to seat assembly 14. Actuator 70 is coupled to slider assembly 66 to allow a seat occupant to selectively move headrest pad 18 to a desirable position. Furthermore, slider assembly 66 functions to automatically couple itself to bushing 64 once posts 20 of headrest assembly 16 are detached from headrest mechanism 10. The interconnection of slider assembly 66 and bushing 64 prevents the emission of undesirable noises such as rattles, squeaks or the sound of components impacting against one another during headrest removal or vehicle operation.

Bushing 64 includes a substantially hollow tubular body 72 and a radially extending flange 74 positioned at one end of body 72. Journals 75 are formed at the opposite end of body 72 for receipt of a portion of return spring 68. A finger 76 extends radially from body 72 and is placed in snap-fit engagement with aperture 48 extending through guidance sleeve 40. Bushing 64 also includes a plurality of axially spaced apart slots 80 extending through body 72. As will be described in greater detail hereinafter, slider assembly 66 selectively engages one of slots 80 to restrict movement of slider assembly 66 when headrest assembly 16 is removed from seat assembly 14.

Radially extending flange 74 includes a first aperture 84 and a second aperture 86 extending therethrough. First aperture 84 is sized to receive post 20 of headrest assembly 16. Aperture 86 is generally formed in the shape of a key-hole slot. Preferably, bushing 64 is constructed from an injection molded polymer such as PA6 or other suitable material.

Slider assembly 66 includes a slider 88 and a block 90. Block 90 is moveably positioned within a cavity 92 of slider 88. Slider 88 includes a housing 94 having a cup 96 and a boss 98. Cup 96 includes a plurality of flexible arms 100 defining a pocket 102. At least one of arms 100 includes an inwardly extending barb 104. When headrest assembly 16 is assembled to seat assembly 14, post 20 is positioned within pocket 102. Barb 104 engages groove 22 in a snap-fit arrangement. Boss 98 includes an aperture 106 extending therethrough. Aperture 106 is aligned with a portion of a slot 108 extending through housing 94. Slider 88 also includes a skirt 110 having a pair of bifurcated legs 112. Each leg 112 includes an upturned flange 114. Return spring 68 includes a T-shaped end 116 coupled to skirt 110 of slider 88.

Figure 9:
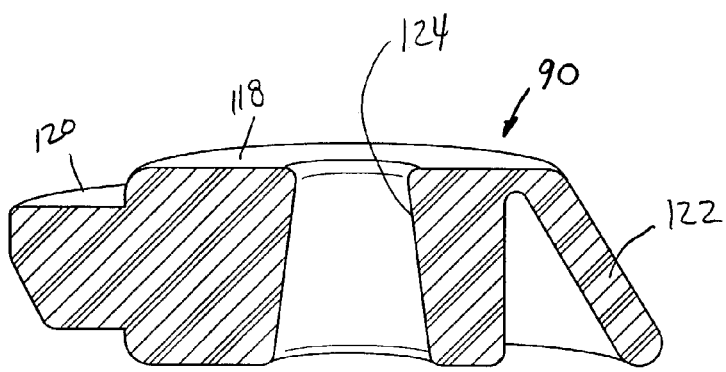
FIG. 9 is a fragmentary perspective view of a block of the headrest mechanism of the present invention.

FIG. 9 illustrates block 90 which includes a generally disc shaped body 118 having a tab 120 extending radially outwardly from body 118. A web 122 angularly extends from body 118 to provide an integral spring to block 90. Block 90 is constructed from a resilient material such as injection moldable PA6. Therefore, web 122 may be repeatedly deformed and returned to its undeformed shape once the load is removed. Block 90 also includes an aperture 124 extending through body 118.

Actuator 70 includes an electric motor 126 and a bowden cable 128. Bowden cable 128 includes a sheath 130 and a wire 132 extending within sheath 130. A nut 134 (FIG. 6) is coupled to the distal end of wire 132. Wire 132 and nut 134 are threaded through slider 88 and aperture 124 of block 90. A portion of aperture 86 of flange 74 is sized to allow nut 134 to pass therethrough. Nut 134 is retained on one side of radially extending flange 74 by translating wire 132 in to the narrow portion of key-hole shaped aperture 86 after the nut is first passed through the large portion.

During operation, headrest mechanism 10 functions with block 90 of slider assembly 66 in one of a disengaged position and an engaged position. FIG. 7 depicts block 90 in a disengaged position from bushing 64. The mode of operation depicted in FIG. 7 occurs when headrest assembly 16 is coupled to seat assembly 14. At this time, post 20 is positioned within pocket 102 having barb 104 engaging groove 22. To position headrest assembly 16, a seat occupant directs electrical current to motor 126 via a switch (not shown). Electric motor 126 causes bowden cable 128 to extend or retract and counteract the force provided by return spring 68. It should be appreciated that bowden cable 128 not only counteracts the force provided by return spring 68, but also counteracts the force input due to the mass of headrest assembly 16. At equilibrium, wire 132 is under tension.

The tension in wire 132 is sufficient to maintain block 90 in a disengaged position by compressing web 122. While tab 120 is disengaged from bushing 64, slider assembly 66 may be driven by electric motor 126 to any number of locations within bushing 64 to position headrest pad 18.

FIG. 8 depicts the engaged position of slider assembly 66 and block 90. Headrest assembly 16 is disconnected from seat assembly 14 by applying an upward force to headrest pad 18 sufficient to withdraw post 20 from pocket 102 and overcome the biasing force supplied by flexible arms 100. Once headrest assembly 16 has been removed, the weight of the headrest assembly no longer acts on slider assembly 66. Accordingly, wire 132 becomes slack. The lateral force from wire 132 on block 90 decreases thereby allowing web 122 to impart an engaging force on tab 120. Furthermore, return spring 68 causes slider assembly 66 to move downwardly due to the force imbalance created by removal of headrest assembly 16. Slider assembly 66 is free to move downwardly only a small distance corresponding to the spacing between slots 80. As slider assembly 66 moves downwardly, tab 120 enters one of slots 80 and extends through body 72 of bushing 64. Slider assembly 66 is coupled to bushing 64 and may no longer freely slide within the bushing.

Headrest assembly 16 may be coupled to seat assembly 14 by simply positioning post 20 within pocket 102. This process introduces tension within wire 132 thereby compressing web 122 and disengaging tab 120 from slot 80. Headrest mechanism 10, once again, functions as earlier described with block 90 being positioned in the disengaged position.

Preferably, bushing 64, slider 88, block 90 and cover 62 are each constructed from an injection moldable polymer such as PA6. The use of an injection moldable polymer allows relatively complex component design such as depicted in the Figures. Additionally, the injection moldable polymer facilities snap-fit interconnections and relatively smooth sliding action of the components relative to one another. However, it should be appreciated that the components of the headrest mechanism may be constructed from a number of materials including polymer compounds, metals or composites.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

The invention claimed is:

1. A headrest mechanism for an occupant seat, the headrest mechanism comprising:
   a post extending from a headrest pad;
   a tubular bushing adapted to be coupled to the occupant seat;
   a slider assembly movably positioned within the bushing, the post being coupled to the slider assembly, the slider assembly including a block selectively moveable between an engaged position and a disengaged position;
   a spring adapted to bias the slider assembly toward a first position; and
   an actuator coupled to the slider assembly to selectively move the slider assembly and position the headrest pad at a desired location, said actuator including a cable interconnecting the tubular bushing and the slider assembly, the actuator operable to move the cable and overcome spring bias to move the slider assembly from the first position toward a second position;
   wherein the block engages the tubular bushing when the post is disconnected from the slider assembly, thereby restricting movement of the slider assembly relative to the tubular bushing.

2. The headrest mechanism of claim 1 wherein said block is biasedly loaded toward said engaged position and wherein said cable retains said block in said disengaged position when said post is coupled to said slider assembly.

3. The headrest mechanism of claim 1 further including a tubular guidance sleeve adapted to be coupled to the occupant seat, said bushing positioned within and coupled to said guidance sleeve.

4. The headrest mechanism of claim 3 wherein said bushing includes a finger positioned in snap-fit engagement with an aperture extending through said guidance sleeve.

5. The headrest mechanism of claim 1 wherein said block includes a tab positioned within a slot extending through said bushing when said block is in said engaged position.

6. A headrest mechanism for an occupant seat, the headrest mechanism comprising:
   a headrest pad having a post extending therefrom;
   an electrical actuator coupled to said post for moving said headrest pad to a desired position; and
   a slider coupled to said post, said slider being selectively driveable by said actuator when said post is coupled to said slider and restricted from movement when said post is disconnected from said slider;
   wherein said post is coupled to said slider in a snap-fit arrangement.

7. The headrest mechanism of claim 6 further including a tubular bushing adapted to be coupled to the occupant seat, said slider being moveably positioned within and selectively engageable with said bushing.

8. The headrest mechanism of claim 7 wherein said slider includes a moveable block selectively engageable with said bushing, said block retained in a disengaged position when said post is coupled to said slider, said block being in an engaged position with said bushing when said post is disconnected from said slider.

9. The headrest mechanism of claim 8 wherein said slider includes a spring biasing said block toward said engaged position.

10. The headrest mechanism of claim 8 wherein said slider moves substantially orthogonally to said block.

11. The headrest mechanism of claim 8 wherein said bushing includes a plurality of spaced apart apertures for receipt of a portion of said block when in said engaged position.

12. The headrest mechanism of claim 6 wherein said actuator includes a cable and a return spring, said return spring urging said slider toward a first position and said cable resisting said urging, said cable being moveable to overcome said biasing and position said slider.

13. A headrest mechanism for an occupant seat, the headrest mechanism comprising:
   a substantially hollow elongated bushing adapted to be coupled to the occupant seat, said bushing having a slot;
   a headrest having a post extending therefrom; and
   a slider assembly selectively moveably positioned within said bushing, said slider assembly including a block having a tab and being operable in a disengaged mode where said slider assembly is moveable within said bushing when said post is coupled to said slider assembly and an engaged mode where said tab is inserted into said slot to restrain said slide assembly from moving relative to said bushing when said post is disconnected from said slider assembly.

14. The headrest mechanism of claim 13 further including a cable extending through said slider assembly, said cable engaging said block and selectively retaining said block in a position disengaged from said bushing when said slider assembly is in said disengaged mode.

15. The headrest mechanism of claim 14 further including an actuator drivingly coupled to said cable to selectively position said slider assembly within said bushing and move said headrest.

16. The headrest mechanism of claim 15 wherein said block is biased toward a position engaged with said bushing in opposition to a force provided by said cable.

17. The headrest mechanism of claim 16 further including a return spring biasing said slider assembly in a first direction and wherein said cable selectively biases said slider assembly in a second direction opposite said first direction.

* * * * *